Patented Jan. 10, 1933

1,894,041

UNITED STATES PATENT OFFICE

HARRY W. HOUGHTON, OF GLEN ECHO, MARYLAND, ASSIGNOR TO SAFETY FUMIGANT COMPANY, OF BOSTON, MASSACHUSETTS, A CORPORATION OF MASSACHUSETTS

FUMIGANT GAS PRODUCING COMPOSITION

No Drawing.   Application filed July 3, 1928. Serial No. 290,283.

This invention relates to a fumigant gas having toxic and warning properties of the general nature of that described in my Patent No. 1,521,537, dated December 30, 1924, and comprises a convenient composition or mixture of chemicals for generating such a gas.

The invention has for its main object to make readily available to the public a fumigant gas that can be safely used by those not having the technical skill and facilities for handling acids and chemicals necessary for generating a mixture of hydrocyanic acid gas and cyanogen chloride gas or the equivalent thereof according to the procedure disclosed in said patent.

Further objects and advantages of this invention appear hereinafter in connection with the following description of an illustrative embodiment or example.

The invention contemplates bringing together in a dry state suitable chemicals for generating a gas of the character referred to and preferably packaging them so as to protect them from moisture. The composition or mixture thus produced is particularly adapted to be used as a filling for a fumigant cartridge of the type disclosed by my copending application Serial No. 44,126, now Patent No. 1,704,607 which is designed to give off a mixture of hydrocyanic acid gas and cyanogen chloride gas by the mere addition of water. A suitable mixture contains, by weight, two parts of fuller's earth, talc, or any other suitable inert ingredient to give bulk to the mixture, and one part each of sodium cyanide (or any other suitable cyanide capable of reacting with carbonic or hypochlorous acid), bleaching powder, the mixed calcium salt of hydrochloric and hypochlorous acids, Cl-Ca-ClO, (for any other suitable salt of hypochlorous or similar acids) and calcium chloride, (or any other suitable deliquescent material or means for attracting moisture to the mixture upon exposure to damp air) all thoroughly mixed together in a dry state. The fuller's earth serves to give body to the mixture, but does not enter into any of the reactions. It may be omitted entirely or its proportion in the composition may be varied without departing from my invention.

When this mixture is exposed to dampness and air it is decomposed and a mixed gas comprising cyanogen chloride and hydrocyanic acid is evolved. This results because the calcium chloride, or other moisture attracting material, draws moisture to the mixture, and the water thus attracted absorbs carbon dioxide from the air to form a solution of carbonic acid ($H_2CO_3$). The carbonic acid ($H_2CO_3$), bleaching powder ($CaCl_2O$) and sodium cyanide ($NaCN$) react to form the hydrocyanic acid ($HCN$) and cyanogen chloride ($CNCl$) gases.

It is presumed that the cyanogen chloride ($CNCl$) is produced by the interaction of liberated hypochlorous acid ($HClO$) and hydrocyanic acid ($HCN$) to form cyanogen chloride and water, but regardless of the intermediate reactions taking place, the bleaching powder ($CaCl_2O$) or similar substance may be termed a "chlorinating agent".

This reaction starts slowly and takes a considerable period of time for its completion, so that the heat produced is dissipated before it can increase the temperature of the mass to a dangerous degree, even when employed in a confined package, such as the above-mentioned cartridge.

Having described an illustrative embodiment of my invention, it is to be understood that I do not restrict myself thereto, but that what I desire to protect by Letters Patent is set forth in the following claims:

1. A fumigant gas producing composition containing a cyanide salt, bleaching powder and calcium chloride in proportions for generating cyanogen chloride and hydrocyanic acid packed in a dry state and adapted to react upon exposure to air and moisture.

2. A fumigant gas producing composition comprising a dry mixture of a cyanide and a chlorinating agent in proportions to produce cyanogen chloride when acted upon by moist air, and a deliquescent substance for attracting moisture thereto.

3. A fumigant gas producing composition comprising a dry mixture of sodium cyanide, bleaching powder and calcium chloride with inert material, said calcium chloride constituting means for attracting moisture to initiate gas producing reactions upon exposure of said mixture to the air.

4. A fumigant gas producing composition comprising a dry mixture of sodium cyanide and bleaching powder with inert material and with a deliquescent material to attract moisture and initiate gas producing reactions upon exposure of said mixture to the air.

5. A fumigant gas producing composition comprising a dry mixture of a cyanide and bleaching powder adapted to generate cyanogen chloride when exposed to air and moisture, said dry mixture also comprising moisture attracting means mixed therein to hasten gas producing reactions upon exposure of said mixture to the air.

In testimony whereof, I have signed my name to this specification.

HARRY W. HOUGHTON.